United States Patent [19]

Ogawa et al.

[11] Patent Number: 5,721,187
[45] Date of Patent: Feb. 24, 1998

[54] OXYGEN ABSORBER

[75] Inventors: Tadatoshi Ogawa, Toyonaka; Takanori Kume, Ichihara, both of Japan

[73] Assignee: Sumitomo Chemical Company, Limited, Osaka, Japan

[21] Appl. No.: 579,370

[22] Filed: Dec. 27, 1995

[30] Foreign Application Priority Data

Dec. 27, 1994 [JP] Japan .................... 6-324483

[51] Int. Cl.$^6$ .................... B01J 20/02; B01J 20/00; B32B 9/04
[52] U.S. Cl. .................... 502/417; 502/400; 502/401; 502/402; 502/406; 426/124; 426/398; 428/411.1
[58] Field of Search .................... 502/417, 406, 502/400, 401, 402; 426/124, 398; 428/411.1

[56] References Cited

U.S. PATENT DOCUMENTS 5,143,769   9/1992   Moriya et al. .................... 428/76

FOREIGN PATENT DOCUMENTS 0 367 390 A2   5/1990   European Pat. Off. .
0 370 802 A1   5/1990   European Pat. Off. .

OTHER PUBLICATIONS

Patent Abstracts of Japan, vol. 13, No. 305 (M–849) 13 Jul. 1989 & JP–A–01 095044.

*Primary Examiner*—Glenn Caldarola
*Assistant Examiner*—In Suk Bullock
*Attorney, Agent, or Firm*—Cushman Darby & Cushman IP Group of Pillsbury Madison & Sutro, LLP

[57] ABSTRACT

An oxygen absorber comprising an active carbon material layer and an oxygen absorbing layer comprising 15–80% by weight of a thermoplastic resin and 85–20% by weight of an oxygen absorbing agent, wherein the amount of the active carbon material is 0.2–15% by weight based on the oxygen absorbing agent. The oxygen absorber is easy to handle and excellent in oxygen absorbing performance, and does not deteriorate the flavor of foods and the like.

24 Claims, No Drawings

OXYGEN ABSORBER

BACKGROUND OF THE INVENTION

The present invention relates to an oxygen absorber for use in preservation of foodstuffs and the like, and more particularly to an oxygen absorber easy to handle, excellent in oxygen-absorbing performance and not deteriorating the flavor of foods and the like.

In preserving a variety of articles including foodstuffs of which quality can be changed by oxygen, an oxygen absorbing agent is often used for the purpose of removing oxygen during preservation of the articles.

Such oxygen absorbing agents have so far been used in the form of an oxygen absorber prepared by packaging an oxygen absorbing agent with a gas-permeable material. This form of article, however, has a problem that, if the packaging with gas-permeable material is not perfect, leakage of the packaged oxygen absorbing agent into outer atmosphere can take place. With the aim of solving this problem, development of a sheet type oxygen absorber is being attempted, and such sheet type oxygen absorber is watched with interest because of an additional merit that it is easy to handle.

As an example of sheet type oxygen absorber excellent in oxygen absorbing performance, the oxygen absorbing sheet prepared by filling an oxygen absorbing agent in a resin and making the resin porous (JP-A-2-229840) can be referred to.

Although such an oxygen absorbing sheet has a high oxygen absorbing performance, it can emit an unpleasant odor under a certain condition. Thus, a further improvement of this type of oxygen absorbing sheet is awaited, for the purpose of making it applicable to general foodstuffs.

In view of the above-mentioned problem, the present inventors have conducted extensive studies on an oxygen absorber which is easy to handle, has a high oxygen absorbing performance and does not deteriorate the flavor of foods and the like. As a result, the present invention has been accomplished.

SUMMARY OF THE INVENTION

Thus, the present invention relates to an oxygen absorber comprising an oxygen absorbing layer and an active carbon material layer, wherein said oxygen absorbing layer comprises 15–80% by weight of a thermoplastic resin and 85–20% by weight of an oxygen absorbing agent and the amount of active carbon material in said active carbon material layer is 0.2–15% by weight based on the amount of oxygen absorbing agent in the oxygen absorbing layer. Also, the present invention further relates to a process for producing said oxygen absorber, an article comprising said oxygen absorber and gas-permeable film or paper which cover said oxygen absorber, use of said oxygen absorber for preserving foods, and a commercial package containing said oxygen absorber together with instructions for the use thereof to preserve foods.

DETAILED DESCRIPTION OF THE INVENTION

In the present invention, the oxygen absorbing layer is a layer comprising 15–80% by weight of a thermoplastic resin and 85–20% by weight of an oxygen absorbing agent. Examples of the thermoplastic resin which can be used in the present invention are olefin type resins including homopolymers of ethylene or α-olefins having 3–12 carbon atoms such as high-density polyethylene, low-density polyethylenes having (a) long chain branch(es) obtained by high-pressure polymerization process or the like, polypropylene, polybutene, polymethylpentene and the like; linear medium-density or linear low-density polyethylenes obtained by copolymerizing ethylene with α-olefins having 3–12 carbon atoms; random copolymers of propylene and ethylene or at least one α-olefin having 4–12 carbon atoms such as propylene-ethylene copolymer, propylene-butene copolymer, ethylene-propylene-butene terpolymer and the like; block copolymers obtained by a homopolymerization of propylene followed by a successive polymerization of propylene and ethylene; copolymers of ethylene and vinyl acetate and/or a (meth)acrylic ester; metallic salts of ethylene-acrylic acid copolymer; and the like. In addition to these olefin type resins, polyester type resins, polyamide type resins and the like are also usable in the invention. The thermoplastic resin used in the invention may be a mixture of two or more polymers, if desired.

Among the thermoplastic resins exemplified above, preferred are polyolefin resins. Among the polyolefin resins, preferred are high-density polyethylenes (density: 0.94 $g/cm^3$ or more) and linear medium-density polyethylenes (density: 0.93 to 0.94 $g/cm^3$) having a melt flow rate at 190° C. of from 0.1 to 10 g/10 minutes in view of a more suppressed emission of odor of oxygen absorbers obtained. From another point of view that the oxygen absorber obtained therefrom is excellent in heat resistance, polypropylene type resins containing propylene monomer unit and having a melt flow rate of 0.5–10 g/10 minutes at 230° C. are preferred.

The oxygen absorbing agents used in the present invention are, for example, metallic type oxygen absorbing agents of which main component is a metal such as iron type metals, and organic type oxygen absorbing agents of which main component is an organic component such as ascorbic acid and the like. Among these compounds, reduced iron is preferably used. A mean particle diameter of the oxygen absorbing agent is preferably 5 μm or more from the viewpoint of easiness of handling of oxygen absorber, and preferably 200 μm or less from the viewpoint of oxygen absorbing performance of oxygen absorber.

An electrolyte may be incorporated into the oxygen absorber for the purpose of enhancing the oxygen absorbing rate of oxygen absorber. Examples of said electrolyte include halides, carbonates, sulfates, hydroxides and the like. Among these salts, halides are preferable, and $CaCl_2$, NaCl and $MgCl_2$ are further preferable.

The method for incorporating an electrolyte into oxygen absorber may be a method of mixing an electrolyte into thermoplastic resin separately from oxygen absorbing agent, or a method of previously coating the surface of oxygen absorbing agent with an electrolyte. The use of an oxygen absorbing agent coated with an electrolyte is particularly preferable from the viewpoint of oxygen absorbing performance of oxygen absorber. The preferable amount of the electrolyte is from 0.1 to 10% by weight based on the amount of the oxygen absorbing agent.

The oxygen absorbing layer is a layer comprising 15–80% by weight of a thermoplastic resin and 85–20% by weight of an oxygen absorbing agent. When the amount of oxygen absorbing agent is larger than 85% by weight, dispersibility of oxygen absorber in thermoplastic resin is not good. In case that an oxygen absorbing layer is to be produced by processing a composition comprising a thermoplastic resin and an oxygen absorbing agent into a sheet by the method of extrusion molding, an amount of oxygen absorbing agent exceeding 85% by weight is undesirable because processability into a sheet is not good under such a condition. When the amount of oxygen absorbing agent is smaller than 20% by weight, the oxygen absorber obtained from such a composition is insufficient in oxygen absorbing performance. Thus, the oxygen absorbing layer preferably comprises 15–70% by weight of a thermoplastic resin and 85–30% by weight of an oxygen absorbing agent.

The oxygen absorbing layer may be a single layer or a composite layer prepared by laminating thin layers comprising thermoplastic resin and oxygen absorbing agent. In the case of composite layer, the method of lamination may be a method of thermal fusion, a method of bonding the whole or a part, and the like. In the case of composite layer, the amounts of oxygen absorbing agent and thermoplastic resin in the oxygen absorbing layer are equal to the total amount of oxygen absorbing agent in the thin layers and the total amount of thermoplastic resin in the thin layers, respectively.

Thickness of the oxygen absorbing layer is preferably in the range of from 0.05 mm to 5 mm.

It is preferable to use the oxygen absorbing layer in the form of porous material, from the viewpoint of oxygen absorbing performance of oxygen absorbing layer. As the method for making the oxygen absorbing layer into a porous material, for example, a method of orienting an oxygen absorbing layer at least monoaxially to make the layer porous is preferable from the viewpoint of realizing a high oxygen absorbing performance of oxygen absorber obtained therefrom.

In this case, draw ratio differs depending on the kind of thermoplastic resin. A draw ratio of from about 2 to about 12 is preferable from the viewpoint of oxygen absorbing performance of oxygen absorbing layer.

As referred to in the present invention, the "active carbon material layer" is a layer containing an active carbon material. Preferably, this is a layer prepared by mixing an active carbon material with a binder comprising pulp or the like as a main component followed by forming the mixture into a paper, or a layer prepared by mixing a fibrous active carbon material with a fibrous resin and forming the mixture into an unwoven fabric. As the method for producing a paper-form layer, the conventional paper-making method can be referred to. As one of the methods for producing an unwoven fabric-form layer, the method of thermal-fusing the fibrous active carbon material to the thermoplastic fibrous resin in the production of the unwoven fabric by spun bond method etc. from the thermoplastic resin can be referred to. As the active carbon material, those exhibiting a high dispersibility in binder, fibrous resin material or the like are preferable. As the active carbon material layer, those in which the active carbon material is dispersed uniformly are preferable. As used herein, the term "active carbon material" means a material selected from powdery active carbon, fibrous active carbon and the like which are conventionally used for deodorization. The active carbon material may be a mixture of two or more materials, if desired.

As the active carbon material layer, active carbon paper prepared by mixing a powdery active carbon with a binder comprising pulp as a main component is particularly preferred, from the viewpoint of cost and easiness of handling.

Further, for the purpose of enhancing the strength of active carbon paper, polyvinyl alcohol resin may be mixed into the binder and/or a powdery polyethylene resin and/or a polyethylene fiber may be mixed into the binder. The resulting mixture can be put to use for production of an active carbon paper.

Although the amount of active carbon material in the active carbon material layer varies depending on the kind of active carbon material, etc., it is preferable that the amount of active carbon material is 5% by weight or more, from the viewpoint of deodorant performance of active carbon material layer. On the other hand, from the viewpoint of processability of active carbon material into a paper-form layer or an unwoven fabric-form layer, the amount of active carbon material in the active carbon material layer is preferably 50% by weight or less.

Thickness of the active carbon material layer is preferably in the range of from 0.01 mm to 1 mm.

The oxygen absorber of the present invention is sometimes used for preservation of foods and the like. In such a case, the oxygen absorber of the present invention can be subjected to a treatment in a commercial microwave oven together with foods.

In case that the oxygen absorber of the present invention is to be treated in a microwave oven, the oxygen absorber should have a microwave oven suitability. In view of the microwave oven suitability of oxygen absorber, the weight of active carbon material per unit volume of active carbon material layer (hereinafter, referred to as "active carbon material density") defined by the following formula (1) is preferably 0.4 g/cm$^3$ or less, more preferably in the range of from 0.005 to 0.4 g/cm$^3$ and still more preferably in the range of from 0.005 to 0.2 g/cm$^3$:

$$\text{Active carbon material density (g/cm}^3\text{)} = \frac{A \times B}{C \times 10^5} \qquad (1)$$

wherein A is the weight of active carbon material layer per unit area (g/m$^2$), B is the amount of active carbon material (%), and C is the thickness of active carbon material layer (mm).

As the active carbon material, powdery ones are preferred, from the viewpoint of prevention from accumulation of heat caused by the electromagnetic wave of microwave oven. Preferred are powdery active carbons of which particle diameter is smaller than 200 mesh sieve (sieve opening: 75 µm) pass, and further preferred are powdery active carbons of which particle diameter is smaller than 325 mesh sieve (sieve opening: 43 µm) pass. Among these active carbons, those having a high dispersibility in active carbon material layer are preferred, and active carbons uniformly dispersed in active carbon material layer are preferred.

The active carbon material layer is used for the purpose of absorbing smelly components other than flavor emitted from foods. The odors to be absorbed are, for example, odors emitted from the oxygen absorbing layer and quality-changed odors by contacting flavor arising from food with oxygen absorbing layer.

The amount of active carbon material in the active carbon material layer is 0.2–15% by weight based on the amount of oxygen absorbing agent in the oxygen absorbing layer. When the amount of active carbon material is smaller than 0.2% by weight based on the amount of oxygen absorbing agent, deodorant effect of the oxygen absorber obtained therefrom is low. When the amount of active carbon material is larger than 15% by weight on the same basis as above, the result is not good because the flavor emitted from foods is also absorbed.

The oxygen absorber of the present invention is an integrated combination of an oxygen absorbing layer and an active carbon material layer. The term "integrated combination of an oxygen absorbing layer and an active carbon material layer" means, for example, a product prepared by mixing a thermally fusible binder into an active carbon material layer and then thermally fusing and laminating the mixture obtained above onto at least one side of an oxygen absorbing layer, or a product prepared by bonding and laminating an active carbon material layer onto at least one side of an oxygen absorbing layer through an adhesive intermediate layer, or a product prepared by packing an oxygen absorbing layer and an active carbon material layer into one package, or the like.

Among these forms of products, the product prepared by bonding an oxygen absorbing layer to an active carbon material layer through an adhesive intermediate layer is preferable from the viewpoint of easiness of handling. As the method of bonding, conventional dry lamination, extrusion lamination, bonding by the use of hot melt resin, and the like can be referred to. Among these methods, the method of extrusion lamination is preferable from the viewpoint of bonding strength between oxygen absorbing layer and active carbon material layer.

Thickness of the adhesive intermediate layer is preferably in the range of approximately from 0.001 mm to 0.2 mm.

The active carbon material layer may be bonded to the oxygen absorbing layer on the whole contact area between the two layers, or on a part of the contact area. As the method for partially bonding an active carbon material layer to an oxygen absorbing layer, the method of dry lamination of partial bonding pattern can be referred to. As the method for bonding on the whole contact area, the method of extrusion lamination and the like can be referred to.

In case of an oxygen absorber in which an active carbon material layer is bonded to an oxygen absorbing layer on the whole contact area between the active carbon layer and oxygen absorbing layer, it is preferable to perforate the oxygen absorber partially, from the viewpoint of oxygen absorbing performance of the oxygen absorber.

As the method for partially perforating the oxygen absorber, the method for perforation using a hot needle, laser or the like can be adopted.

The oxygen absorber of the present invention can be put to use in various forms. For example, when the oxygen absorber is used for preservation of foods or the like, the direct contact between food and oxygen absorber can be avoided by using a package form prepared by packing an oxygen absorber with a packaging material having gas-permeability in at least one surface of the package, or a form prepared by bonding an oxygen absorbing layer to an active carbon material layer and then applying a variety of materials to the oxygen absorbing layer side and/or the active carbon material layer side.

Particularly when the oxygen absorber is covered with other material for the purpose of packaging or the like, it is preferable that the oxygen absorber is a product prepared by forming a composition comprising a thermoplastic resin and an oxygen absorbing agent into a sheet and then orienting the sheet at least monoaxially to obtain a porous material, because such a product is expected to absorb oxygen even on terminal surfaces and therefore the oxygen absorber thus obtained is expected to be excellent in oxygen absorbing performance.

As the material used for covering the oxygen absorber of the present invention, gas-permeable film, heat-sensitive paper, water-resistant paper, printed film and the like can be used, among which gas-permeable film is preferable, though it does not limit the present invention.

The oxygen absorber of the present invention is produced by, for example, the following process. First, a thermoplastic resin and an oxygen absorbing agent and optional ingredients such as an electrolyte, a dispersant, a stabilizer and the like are mixed or kneaded in the usual way using a roll type or Banbury type mixer or a single screw or double screw extruder to prepare a composition.

In case of some types of thermoplastic resins, an oxygen absorbing agent and optionally a dispersant, a stabilizer and the like are fused onto a thermoplastic resin by the method of gelation to prepare a composition.

Subsequently, an oxygen absorbing layer is prepared from this composition by the usual molding process such as T die molding process or the like. The use of double conical extruder is particularly preferable from the viewpoint of stable production of oxygen absorbing layer.

An oriented porous oxygen absorbing layer can be produced from a composition obtained above by, for example, forming the composition into a sheet by the usual molding process such as T die molding process or the like and then monoaxially or biaxially orienting the sheet. In the case of monoaxial orientation, roll orientation is preferable, although tubular orientation is also adoptable. The orientation may be carried out in one step or in two or more steps. The biaxial orientation may be any of a simultaneous biaxial orientation and a successive biaxial orientation which is a longitudinal orientation followed by a transverse orientation.

An active carbon material layer is preferably produced by mixing an active carbon material with a binder comprising mainly pulp or the like and forming the mixture into paper according to conventional method, or by mixing a fibrous active carbon material with a fibrous resin into an unwoven fabric as mentioned above.

The oxygen absorbing layer and active carbon material layer thus obtained can be made into an integrated body by the method of, for example, extrusion lamination. When extrusion lamination is carried out, a material which can be bonded to oxygen absorbing layer is used as the laminate resin. When the oxygen absorbing layer is constituted of a polyethylene type resin, it is preferable to use a low-density polyethylene having (a) long chain branch(es), a high-density polyethylene or the like as the laminate resin.

Thickness of the laminate resin may be selected appropriately. By bonding together an oxygen absorbing layer and an active carbon material layer by the method of, for example, sand lamination, an oxygen absorber of the present invention can be obtained.

The oxygen absorber of the present invention is easy to handle and high in the oxygen absorbing performance. Further, it emits no intense odor and does not deteriorate the flavor of foods and the like seriously. Further, it is superior in microwave oven suitability, and can easily be formed into various shapes such as package, cap, label and the like. Accordingly, the oxygen absorber of the present invention is quite effectively usable for preservation of foodstuffs and the like.

EXAMPLES

Next, the present invention is explained in more detail with reference to the following non-limitative examples. The properties mentioned in the examples and comparative examples were measured in the following manners.

[Odor]

Two hundred grams of an oxygen absorber was introduced into a glass-made closed vessel having a capacity of 500 cc together with 1 g of water. After heating the content of the vessel at 60° C. for one hour, it was allowed to cool at 23° C. for 30 minutes. After cooling, odor of the oxygen absorber was measured and evaluated according to the following criteria:

A: No odor is perceivable at all.

B: Some persons perceive a slight odor.

C: An explicit odor is perceivable.

[Flavor]

Fifty grams of a sponge-cake and 0.6 g of an oxygen absorber were tightly packaged into a KON/PE bag (KON: vinylidene-coated nylon), provided that the amount of air in the bag was 150 cc. After allowing the bag to stand at 25° C. for 7 days, the flavor was measured and the results were evaluated according to the following criteria:

A: The flavor of sponge-cake was very good.

B: The flavor of sponge-cake sometimes felt slightly changed.

C: The flavor of sponge-cake explicitly decreased.

[Oxygen Absorbing Performance]

Oxygen absorbing performance was measured by weighing out an oxygen absorber so that the weight of oxygen absorbing agent in the weighed sample came to 0.5 g, allowing the sample to stand in a closed atmosphere of 100 cc oxygen/100 cc nitrogen/humidity 100% RH at 23° C. for 24 hours, and thereafter measuring the quantity of absorbed oxygen (cc).

[Microwave Oven Suitability]

Microwave oven suitability was evaluated by placing an oxygen absorber sample in a commercial microwave oven (Hitachi Microwave Oven Model MR-33) so that the active carbon material layer of the oxygen absorber faced upward, and continuously observing the change in shape of the oxygen absorber under a condition of 500W. The result of observation was expressed in terms of the period of time required for firstly showing a change in appearance such as fuming.

[Example 1]

As a thermoplastic resin, a powdery high-density polyethylene having a density of 0.963 g/cm$^3$ and MFR of 5.5 g/10 minutes at 190° C. (hereinafter referred to as Resin A) was used. As an oxygen absorbing agent, a reduced iron having a mean particle diameter of 100 μm coated with 2% of calcium chloride was used.

A composition for use as oxygen absorbing layer was prepared by charging 30% by weight of Resin A and 70% by weight of oxygen absorbing agent into a Henschel mixer (manufactured by Mitsui Mining Co., Ltd.) and carrying out gelation at 120° C. The gelation powder composition thus obtained was formed into a film having a thickness of 1.5 mm by extrusion using a double conical extruder (manufactured by Toshiba Machine Co., Ltd.) and according to T die molding process.

The sheet thus obtained was oriented at a draw ratio of 8 at 124° C. by means of a roll type monoaxial orientation machine to form an oxygen absorbing layer. The weight per unit area of the oxygen absorbing layer was 500 g/m$^2$.

As the active carbon material layer, a paper-like material prepared by mixing 25% by weight of a powdery active charcoal which passed through 325 mesh sieve (sieve opening: 43 μm) (hereinafter referred to as Active Charcoal A) with 75% by weight of pulp as a binder and forming the mixture into a paper was used. The weight per unit area of the active carbon material layer was 40 g/m$^2$, and thickness thereof was 80 μm. Using a low-density polyethylene having (a) long chain branch(es) and an MFR value of 7 g/10 minutes as a laminate resin, the active carbon material layer was laminated onto the oxygen absorbing layer by the method of sand lamination. The sand lamination was carried out at a laminate resin temperature of 280° C. Thickness of the laminate resin was 20 μm. The laminated active carbon material layer had the same area as that of the oxygen absorbing layer.

As shown in Table 1, the oxygen absorber prepared in the above-mentioned manner showed good odor characteristic, oxygen absorbing characteristic and microwave oven suitability.

[Example 2]

An active carbon material layer was prepared by mixing 2.5% by weight of Active Charcoal A with 97.5% by weight of pulp as a binder and forming the mixture into a paper-like material. The active carbon material had a weight per unit area of 80 g/m$^2$ and a thickness of 180 μm. The active carbon material layer was laminated onto the same oxygen absorbing layer as in Example 1 in the same manner as in Example 1 to prepare an oxygen absorber. The results were as shown in Table 1.

[Example 3]

An active carbon material layer was prepared by mixing 25% by weight of Active Charcoal A with 65% by weight of pulp and 10% by weight of polyvinyl alcohol resin as binder materials, and forming the mixture into a paper-like material. The active carbon material layer had a weight per unit area of 40 g/m$^2$ and a thickness of 70 μm. The active carbon material layer was laminated onto the same oxygen absorbing layer as in Example 1 in the same manner as in Example 1 to prepare an oxygen absorber. The results were as shown in Table 1. The peeling strength between the active carbon material layer and the oxygen absorbing layer was good.

[Example 4]

As a thermoplastic resin, a powdery polypropylene having a density of 0.900 g/cm$^3$ and an MFR value of 1.3 g/10 minutes at 230° C. (hereinafter referred to as Resin B) was used. As an oxygen absorbing agent, a reduced iron having a mean particle diameter of 100 μm coated with 2% of calcium chloride was used.

A thin film having a thickness of 0.1 mm was prepared by charging 20% by weight of Resin B and 80% by weight of the oxygen absorbing agent into a Henschel mixer (manufactured by Mitsui Mining Co., Ltd.), carrying out gelation at 145° C., and forming the resulting gelation powder composition into a thin film by extrusion using a single screw extruder (manufactured by Toshiba Machine Co., Ltd.) and according to T die molding process.

Ten sheets of the thin film thus obtained were bonded together by pin-point lamination method using a polyurethane type resin, provided that a pattern of 0.02 mmφ was employed and the area of application was 25% of one side of the thin film, to prepare an oxygen absorbing layer. By laminating the same active carbon material layer as in Example 1 with the oxygen absorbing layer obtained above in the same manner as in Example 1 to prepare an oxygen absorber.

The results were as shown in Table 1.

[Example 5]

An oxygen absorber was prepared by repeating the procedure of Example 1, except that an active carbon material layer was laminated onto an oxygen absorbing layer by a sand lamination processing using extruder and perforations of 0.1 mmφ were made through the oxygen absorber thus obtained by means of laser at intervals of 1 cm in both

[Example 6]

An oxygen absorber was prepared by repeating the procedure of Example 1, except that an active carbon material layer and an oxygen absorbing layer were laminated by pin-point lamination method using a polyurethane type resin, provided that a pattern of 0.02 mm$\phi$ was employed and the area of application was 25% of the contact area between active carbon material layer and oxygen absorbing layer. The results were as shown in Table 1.

[Example 7]

As an active carbon material layer, a material prepared by mixing 20% by weight of a fibrous active charcoal with 80% by weight of polyethylene fiber and forming the mixture into an unwoven fabric was used. The active carbon material thus obtained had a weight per unit area of 40 g/m$^2$ and a thickness of 100 µm. An oxygen absorber was prepared by laminating the active carbon material layer onto the same oxygen absorbing layer as in Example 1. The results were as shown in Table 1.

[Example 8]

Into a Henschel mixer (manufactured by Mitsui Mining Co., Ltd.) was charged 30% by weight of Resin A and 70% by weight of oxygen absorbing agent and a gelation was carried out at 120° C. The gelation powder composition thus obtained was formed into a film having a thickness of 0.5 mm by extrusion using a double conical extruder (manufactured by Toshiba Machine Co., Ltd.) and according to T die molding process.

The sheet thus obtained was oriented at a draw ratio of 6 at 124° C. by means of a roll type mono-axial orientation machine to form an oxygen absorbing layer. The weight per unit area of the oxygen absorbing layer was 250 g/m$^2$.

As the active carbon material layer, a paper-like material prepared by mixing 25% by weight of Active Charcoal A with 75% by weight of pulp as a binder and forming the mixture into a paper was used. The weight per unit area of the active carbon material layer was 80 g/m$^2$, and thickness thereof was 160 µm.

Using a low-density polyethylene having (a) long chain branch(es) of which MFR at 190° C. was 7 g/10 minutes as a laminate resin, the active carbon material layer was laminated onto the oxygen absorbing layer by the method of sand lamination to obtain an oxygen absorber. The sand lamination was carried out at a laminate resin temperature of 280° C. Thickness of the laminate resin was 30 µm. The results were as shown in Table 1.

[Example 9]

An active carbon material layer was prepared by mixing 50% by weight of Active Charcoal A with 50% by weight of pulp as a binder and forming the mixture into a paper-like material. The active carbon material layer had a weight per unit area of 40 g/m$^2$ and a thickness of 40 µm. The active carbon material layer was laminated onto the same oxygen absorbing layer as in Example 1 in the same manner as in Example 1 to prepare an oxygen absorber. The results were as shown in Table 1.

[Comparative Example 1]

An oxygen absorbing layer was prepared by repeating Example 1, except that the amount of Resin A was 85% by weight and the amount of the oxygen absorbing agent was 15% by weight. The oxygen absorbing layer thus obtained had a weight per unit area of 230 g/m$^2$. An oxygen absorber was prepared by laminating the same active carbon material layer as in Example 1 onto the oxygen absorbing layer obtained above in the same manner as in Example 1. As shown in Table 1, the oxygen absorber obtained herein was inferior in oxygen absorbing performance.

[Comparative Example 2]

It was attempted to obtain an oxygen absorbing layer by repeating the procedure of Example 1, except that the composition for use as oxygen absorbing layer comprising 10% by weight of Resin A and 90% by weight of oxygen absorbing agent. However, no satisfactory sheet could be obtained because of bad processing characteristics of the composition.

[Comparative Example 3]

As the active carbon material layer, a material prepared by mixing 50% by weight of Active Charcoal A with 50% by weight of pulp as a binder and forming the mixture into a paper-like material was used. The active carbon material layer thus obtained had a weight per unit area of 60 g/m$^2$ and a thickness of 90 µm. The active carbon material layer obtained above was laminated onto the same oxygen absorbing layer as in Example 8 in the same manner as in Example 8 to obtain an oxygen absorber.

The oxygen absorber obtained herein was not practical because the active carbon material was used in an excessively large amount so that flavor of foods was removed completely.

[Comparative Example 4]

An oxygen absorbing layer was prepared by forming the same oxygen absorbing layer composition as in Example 1 into a sheet and orienting the sheet at a draw ratio of 3 at 124° C. by means of a roll type monoaxial orientation machine. The weight per unit area of the oxygen absorbing layer was 1,000 g/m$^2$.

As an active carbon material layer, a material prepared by mixing 2.5% by weight of Active Charcoal A with 97.5% by weight of pulp as a binder and forming the mixture into a paper-like material was used. The active carbon material layer thus obtained had a weight per unit area of 40 g/m$^2$ and a thickness of 70 µm. The oxygen absorbing layer and the active carbon material layer obtained above were laminated in the same manner as in Example 1 to obtain an oxygen absorber. The results were as shown in Table 1.

The oxygen absorber obtained herein was not good in deodorant characteristics because of insufficient amount of active carbon.

[Comparative Example 5]

A mixture was prepared by subjecting the same oxygen absorbing layer composition as in Example 1 to gelation at 120° C. to obtain a gelation powder and then adding thereto Active Charcoal A so that the amount of Active Charcoal A came to 2.8% by weight based on the amount of oxygen absorbing agent. Using this mixture, an oxygen absorbing layer containing Active Charcoal A was prepared in the same manner as in Example 1. The oxygen absorbing layer containing Active Charcoal A thus obtained was evaluated on oxygen absorbing performance. The results were as shown in Table 1. The sample of this comparative example containing active carbon material in the oxygen absorbing layer thereof was inferior in deodorant characteristics as shown in Table 1.

TABLE 1

|  | Example 1 | Example 2 | Example 3 | Example 4 | Example 5 |
|---|---|---|---|---|---|
| Form of oxygen absorbing layer | Porous material by orientation | Porous material by orientation | Porous material by orientation | Non-porous material | Porous material by orientation |
| Weight of oxygen absorbing layer (g/m$^2$) | 500 | 500 | 500 | 3,100 | 500 |
| Concentration of oxygen absorbing agent (%) | 70 | 70 | 70 | 80 | 70 |
| Draw ratio | 8 | 8 | 8 | None | 8 |
| Active carbon material | Powdery active charcoal | Powdery active charcoal | Powdery active charcoal | Powdery active charcoal | Powdery active charcoal |
| Binder | Pulp | Pulp | Pulp/PVA | Pulp | Pulp |
| Weight of active carbon material layer (g/m$^2$) | 40 | 80 | 40 | 40 | 40 |
| Thickness of active carbon material layer (mm) | 0.08 | 0.18 | 0.07 | 0.08 | 0.08 |
| Concentration of active carbon material (%) | 25 | 2.5 | 25 | 25 | 25 |
| Active carbon material/oxygen absorbing agent ratio (%) | 2.8 | 0.6 | 2.8 | 0.4 | 2.8 |
| Density of active carbon material (g/cm$^3$) | 0.13 | 0.01 | 0.14 | 0.13 | 0.13 |
| Mode of application | Extrusion lamination | Extrusion lamination | Extrusion lamination | Extrusion lamination | Extrusion lamination/ Partial perforation |
| Oxygen absorbing performance (cc/24 hr) | 38 | 38 | 39 | 8 | 42 |
| Odor | A | B | A | A | A |
| Flavor | A | A | A | A | A |
| Microwave oven suitability (sec) | 300< | 300< | 300< | 300< | 300< |

|  | Example 6 | Example 7 | Example 8 | Example 9 | Comparative Example 1 | Comparative Example 2 |
|---|---|---|---|---|---|---|
| Form of oxygen absorbing layer | Porous material by orientation | Porous material by orientation | Porous material by orientation | Porous material by orientation | Porous material by orientation | — |
| Weight of oxygen absorbing layer (g/m$^2$) | 500 | 500 | 250 | 500 | 230 | — |
| Concentration of oxygen absorbing agent (%) | 70 | 70 | 70 | 70 | 15 | 90 |
| Draw ratio | 8 | 8 | 6 | 8 | 8 | — |
| Active carbon material | Powdery active charcoal | Fibrous active charcoal | Powdery active charcoal | Powdery active charcoal | Powdery active charcoal | — |
| Binder | Pulp | PE fiber | Pulp | Pulp | Pulp | — |
| Weight of active carbon material layer (g/m$^2$) | 40 | 40 | 80 | 40 | 40 | — |
| Thickness of active carbon material layer (mm) | 0.08 | 0.1 | 0.16 | 0.04 | 0.08 | — |
| Concentration of active carbon material (%) | 25 | 25 | 25 | 50 | 25 | — |
| Active carbon material/oxygen absorbing agent ratio (%) | 2.8 | 2.3 | 11.4 | 5.7 | 29.0 | — |
| Density of active carbon material (g/cm$^3$) | 0.13 | 0.08 | 0.13 | 0.5 | 0.13 | — |

TABLE 1-continued

| Mode of application | Dry lamination | Extrusion lamination | Extrusion lamination | Extrusion lamination | Extrusion lamination | — |
|---|---|---|---|---|---|---|
| Oxygen absorbing performance (cc/24 hr) | 45 | 39 | 45 | 38 | 3 | — |
| Odor | A | A | A | A | — | — |
| Flavor | A | A | B | B | — | — |
| Microwave oven | 300< | 240 | 300< | 270 | — | — |

| | Comparative Example 3 | Comparative Example 4 | Comparative Example 5 |
|---|---|---|---|
| Form of oxygen absorbing layer | Porous material by orientation | Porous material by orientation | Porous material by orientation |
| Weight of oxygen absorbing layer (g/m$^2$) | 250 | 1,000 | 500 |
| Concentration of oxygen absorbing agent (%) | 70 | 70 | 70 |
| Draw ratio | 6 | 3 | 8 |
| Active carbon material | Powdery active charcoal | Powdery active charcoal | Powdery active charcoal |
| Binder | Pulp | Pulp | — |
| Weight of active carbon material layer (g/m$^2$) | 60 | 40 | — |
| Thickness of active carbon material layer (mm) | 0.09 | 0.07 | — |
| Concentration of active carbon material (%) | 50 | 2.5 | — |
| Active carbon material/oxygen absorbing agent ratio (%) | 17.1 | 0.1 | 2.8 |
| Density of active carbon material (g/cm$^3$) | 0.33 | 0.01 | — |
| Mode of application | Extrusion lamination | Extrusion lamination | — |
| Oxygen absorbing performance (cc/24 hr) | 37 | 16 | 40 |
| Odor | A | C | C |
| Flavor | C | — | B |
| Microwave oven suitability (sec) | 300< | 300< | — |

What is claimed is:

1. An oxygen absorber comprising at least one active carbon material layer and at least one oxygen absorbing layer, said oxygen absorbing layer comprising 15–80% by weight of a thermoplastic resin and 85–20% by weight of an oxygen absorbing agent, and the amount of active carbon material in said active carbon material layer being 0.2–15% by weight based on the amount of oxygen absorbing agent in said oxygen absorbing layer.

2. The oxygen absorber according to claim 1, wherein said oxygen absorbing layer is a porous material.

3. The oxygen absorber according to claim 2, wherein said oxygen absorbing layer is an at least monoaxially oriented porous material.

4. The oxygen absorber according to claim 1, wherein said active carbon material layer is laminated on at least one side of said oxygen absorbing layer.

5. The oxygen absorber according to claim 4, wherein said active carbon material layer is laminated onto at least one side of said oxygen absorbing layer through an adhesive intermediate layer.

6. The oxygen absorber according to claim 1, wherein the active carbon material in said active carbon material layer is powdery active charcoal.

7. The oxygen absorber according to claim 6, wherein the weight of said powdery active charcoal is 0.4 g or less per cm$^3$ of the active carbon material layer.

8. The oxygen absorber according to claim 6, wherein said powdery active charcoal has particle diameter of smaller than 200 meshes sieve (sieve opening: 75 μm) pass.

9. The oxygen absorber according to claim 6, wherein said powdery active charcoal has particle diameter of smaller than 325 mesh sieve (sieve opening: 43 μm) pass.

10. The oxygen absorber according to claim 1, wherein said oxygen absorbing agent is metallic type oxygen absorbing agent comprising iron as a main component.

11. The oxygen absorber according to claim 1, wherein the content of said active carbon material in said active carbon material layer ranges from 5 to 50% by weight.

12. The oxygen absorber according to claim 1, wherein the thickness of said oxygen absorbing layer ranges from 0.05 to 5 mm.

13. The oxygen absorber according to claim 1, wherein the thickness of said active carbon material layer ranges from 0.01 to 1 mm.

14. A process for producing an oxygen absorber which comprises the step of:

(a) laminating an active carbon material layer onto at least one side of an oxygen absorbing layer comprising 15–80% by weight of a thermoplastic resin and 85–20% by weight of an oxygen absorbing agent so that the amount of the active carbon material be 0.2–15% by weight based on the amount of oxygen absorbing agent in the oxygen absorbing layer.

15. The process for producing an oxygen absorber according to claim 14, wherein the step (a) includes the steps of:

(a1) mixing an active carbon material with a pulp to obtain a mixture, (a2) forming the mixture into a paper-formed layer, and (a3) using the paper-formed layer as said active carbon material layer.

16. The process for producing an oxygen absorber according to claim 14, wherein the step (a) includes the step of:

(a4) laminating said active carbon material layer onto at least one side of said oxygen absorbing layer through an adhesive intermediate layer.

17. An article comprising said oxygen absorber according to any one of claims 1 to 13 and gas-permeable film or paper, said gas-permeable film or paper covering said oxygen absorber.

18. A process for preserving food which comprises the steps of:

(a) providing an oxygen absorber which is obtained by laminating an active carbon material layer onto an oxygen absorbing layer, said oxygen absorbing layer comprising 15–80% by weight of a thermoplastic resin and 85–20% by weight of an oxygen absorbing agent, wherein the amount of the active carbon material in said active carbon material layer is 0.2 to 15% by weight based on the amount of oxygen absorbing agent in said oxygen absorbing layer;

(b) forming an article by covering said oxygen absorber with a gas-permeable film or paper; and (c) packing foods together with said article.

19. A process according to claim 18, wherein said oxygen absorbing layer is an at least mono-axially oriented porous material.

20. A process according to claim 18, wherein said active carbon material layer is laminated on at least one side of said oxygen absorbing layer through an adhesive intermediate layer.

21. A process according to claim 18, wherein said oxygen absorbing layer is a metallic type oxygen absorbing agent which comprises iron as a main component.

22. A process according to claim 18, wherein said step (a) further comprises the sub-steps of mixing said active carbon material with a pulp to obtain a mixture, forming said mixture into a paper-formed layer, and using the paper-formed layer as said active carbon material layer.

23. A process according to claim 18, wherein said step (a) includes the sub-step of:

laminating said active carbon material layer onto at least one side of said oxygen absorbing layer through an adhesive intermediate layer.

24. A commercial package containing said oxygen absorber according to any one of claims 1–13 together with instructions for the use thereof to preserve foods.

* * * * *